Sept. 27, 1966    A. ADAMS ETAL    3,275,141
BENEFICIATION OF LANGBEINITE-CONTAINING MATERIALS
Filed Jan. 31, 1964
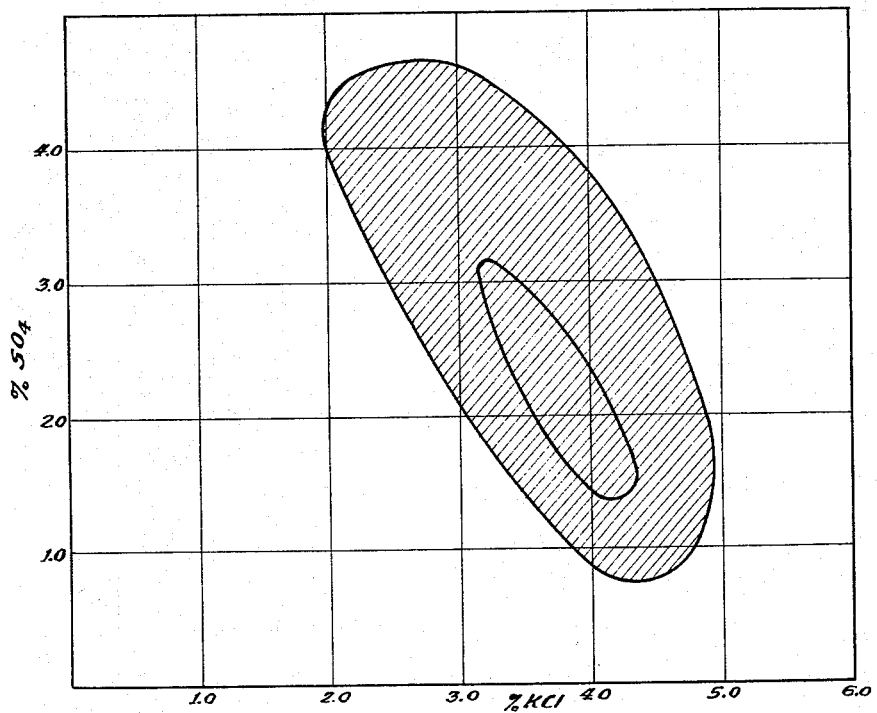
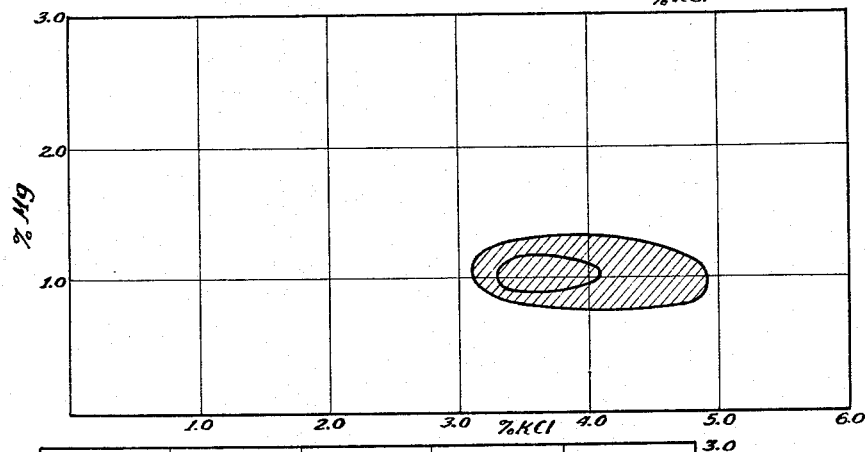
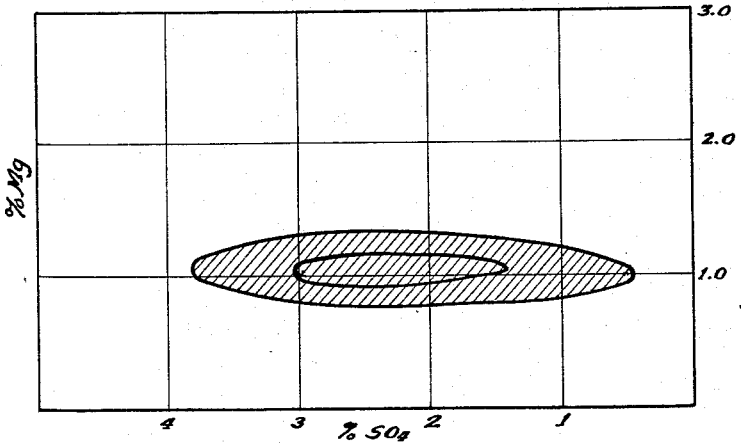
Inventors:
Albert Adams
Sam E. Tschappler
Hans U. Ziemer

United States Patent Office 3,275,141
Patented Sept. 27, 1966

3,275,141
BENEFICIATION OF LANGBEINITE-CONTAINING MATERIALS
Albert Adams and Sam E. Tschappler, Carlsbad, N. Mex., and Hans U. Ziemer, Essen (Ruhr), Germany, assignors to International Minerals & Chemicals Corporation, a corporation of New York
Filed Jan. 31, 1964, Ser. No. 341,518
18 Claims. (Cl. 209—166)

This application is a continuation-in-part of United States patent application Serial No. 221,347, now abandoned, filed September 4, 1962.

The present invention generally relates to the beneficiation of materials containing complex salts of magnesium sulfate and potassium sulfate, such as langbeinite-containing materials. In a more particular aspect it relates to the froth flotation beneficiation of langbeinite ores.

As is well known, potassium or potash is of great economic importance. Potassium is an essential plant nutrient and large amounts of potassium-containing materials are used in fertilizers. On the North American continent one frequently encountered potash salt is sylvite (KCl). The sylvite is not usually found as the pure salt but as sylvinite ore, which is a mixture of sylvite and halite (NaCl). The sylvite values in potash ores, such as sylvinite ore, may readily be processed or concentrated by various concentration processes, such as crystallization, froth flotation, etc.

Langbeinite ($K_2SO_4 \cdot 2MgSO_4$) as well as leonite $$(MgSO_4 \cdot K_2SO_4 \cdot 4H_2O)$$

and schoenite ($MgSO_4 \cdot K_2SO_4 \cdot 6H_2O$), are also found in potash ores, such as the potash ores in the Permian Basin of the southwest area of the United States, which are mined chiefly in the Carlsbad district of New Mexico. These complex salts are useful fertilizer ingredients since they not only contain potassium but also magnesium and sulphur which are essential plant nutrients especially desirable for fertilizing alfalfa, soy beans, cotton, etc. They are also desirable as fertilizer ingredients because they represent a chloride-free source of potash, which is desirable for fertilizing certain crops. Langbeinite, leonite and schoenite ores are, however, generally difficult to beneficiate using conventional processes.

It is an object of the present invention to provide a novel process for beneficiating materials containing complex salts of magnesium sulfate and potassium sulfate.

It is a specific object of the invention to provide a froth flotation process for beneficiating langbeinite-containing materials.

It is another specific object of the present invention to provide an anionic froth flotation process for beneficiating langbeinite-containing materials.

These and other objects and advantages of the present invention will be apparent from the description of the invention.

In general, the present invention comprises conditioning a solid material containing a complex salt of magnesium sulfate and potassium sulfate in a brine slurry with an anionic flotation reagent, subjecting the conditioned material to froth flotation, and recovering a complex salt of magnesium sulfate and potassium sulfate flotation concentrate.

The process of the present invention concentrates magnesium sulfate-potassium sulfate complex salt minerals from ores or other mixtures containing such minerals. The process is effective to concentrate potash minerals from ores or other mixtures containing magnesium sulfate-potassium sulfate complex salt minerals and is particularly effective to concentrate langbeinite from mixtures containing langbeinite and halite, or langbeinite, sylvite and halite as their principal constituents. Concentrates from other beneficiation processes or tailings from other beneficiation processes may be used in the process of this invention. In sylvite flotation processes, a tailing containing significant amounts of langbeinite and halite is usually discharged as a tailing. Such tailings may be beneficiated in the process of the present invention to recover the langbeinite therefrom. Sylvite flotation concentrates produced in froth flotation operations also frequently contain significant amounts of langbeinite. The process of the present invention may be used to substantially separate the langbeinite from the sylvite in such concentrates. A sylvite concentrate of lower langbeinite content and higher $K_2O$ content may thus be obtained.

Of the complex salts containing magnesium sulfate and potassium sulfate found in nature, langbeinite is the most abundant mineral and the following description of the invention is primarily directed to the beneficiation of langbeinite; however, it is to be understood that the process of the present invention invention will also beneficiate other complex salts containing magnesium sulfate and potassium sulfate such as leonite and schoenite.

In the process of the present invention, langbeinite is floated from the other materials. In order to effect such a separation it is, of course, necessary that the langbeinite be substantially liberated from the gangue, that is the particulate mixture to be beneficiated should contain discrete particles of langbeinite and discrete particles of gangue material. It is also necessary that the feed be of a particle size suitable for froth flotation beneficiation. In general, the particles in the feed should be of —4 mesh size and preferably of —8 mesh size. In general, granular potash products are more desirable than finely divided potash products. Accordingly, when the feed material is of about —8 mesh and is substantially liberated, further reduction in size is not preferred. When a langbeinite ore feed is used, in general, the upper size limit is dependent on the crushing characteristics of the ore as regards the liberation of the langbeinite or one of the major gangue constituents. In substantially all langbeinite ores, langbeinite is associated with halite and the purpose of the present beneficiation process is, of course, to separate the langbeinite from the halite. The potash ore containing langbeinite is, therefore, comminuted to economical liberation size to produce a granular feed material. The comminution of the ore to liberation of the various constituents to be separated is effected to liberate a substantial amount of the various constituents. It may be desirable or economical to comminute the ore to liberate substantially all of the constituents; however, the ore may be liberated to a lesser extent, for example, to 70–80% liberation. This granular material is sized to produce a granular feed of particle size of about —8 mesh, and preferably of —8 +100 mesh particles, and still more particularly of —10 +48 mesh particles. It is specifically preferred that the feed contain less than about 50% by weight —65 mesh potash mineral particles and less than about 25% by weight of —100 mesh potash mineral particles and still more preferably less than 10% by weight of —100 mesh potash mineral particles. It has been determined that the +100 mesh potash mineral particles are only slowly soluble at ambient flotation conditions. The —100 mesh potash mineral particles are, however, more rapidly soluble and tend to saturate the flotation brine with respect to KCl, Mg and $SO_4$, which has an adverse effect on the flotation operation as is hereinafter described in greater detail.

The comminution of the ore may be carried out in any suitable type of grinding or crushing apparatus, such as, for example, ball mills, roller mills, hammer mills, rod mills, impactors, etc. When the ore is ground to the mesh sizes indicated above, the langbeinite values, the sylvite values, and the halite values are substantially completely separated from each other and the ore is ready for further treatment in accordance with this invention.

As hereinbefore set forth, the process of the present invention is also effective to separate langbeinite in sylvite flotation concentrates and tailings from other beneficiation processes. These concentrates and tailings already contain langbeinite in liberated form and in a size range suitable for flotation and generally need not be further comminuted; however, when desirable, these may be further comminuted.

The liberated langbeinite materials, especially langbeinite ores after comminuting and sizing, often contain an appreciable amount of primary clay slimes. Slimes are objectionable because they absorb the flotation reagent. This reagent absorbing property of slimes constitutes one of the chief objections to the presence of slimes in a flotation operation. It is, therefore, preferable for the feed to the flotation to be substantially slime-free or "deslimed" prior to the flotation operation. The liberated langbeinite material containing slimes is, therefore, preferably subjected to a desliming operation in which a substantial amount of slimes is removed. A material that has been subjected to a desliming operation is conventionally referred to in the art as a "deslimed" material although the "deslimed" material usually still contains slimes. The amount of slimes in the deslimed material is, however, substantially less than in the material before the desliming operation.

In a potash ore desliming operation, the potash ore is pulped in a brine substantially saturated with respect to the water-soluble constituents of the ore, and the pulp is then passed through suitable scrubbing and separation devices, such as, inter alia, hydrocyclones, hydroseparators, classifiers, etc., which are designed and operated to remove a substantial amount of the slimes. It has also been determined that a beneficial removal of a substantial portion of the clay slimes may be effected by a quick wash with a brine substantially saturated with respect to the langbeinite ore. In a pilot plant operation, this type of quick wash removed about three-fourths of the liberated clay slimes. The quick wash may effectively be conducted by the use of a washing screen, with a spray of the brine being directed onto the ore fraction on the screen. Other suitable quick wash methods may, however, be used to effect a substantial removal of the liberated slimes.

For economic reasons, plant size limitations, and process limitations, desliming operations do not achieve complete desliming of the ore and it is, therefore, preferred to add a slime controllant, such as, inter alia, starch to the substantially slime-free ore to render the remaining slimes less objectionable in the flotation operation. The presence of slimes in an anionic flotation of langbeinite has been found to be highly objectionable unless a slime controllant is used. Recoveries of langbeinite from a mixture containing slimes in an anionic flotation using a slime controllant are significantly higher than in a flotation operation carried out in the absence of a slime controllant.

It is preferred that the langbeinite-containing material be conditioned with the slime controllant prior to conditioning with an anionic collector. Accordingly, in a preferred embodiment, the langbeinite-containing material is introduced into a conditioner wherein the material is conditioned with a slime-controllant. In the conditioner the langbeinite-containing material is conditioned in the form of a relatively thick pulp or slurry of the material in the brine. The brine used preferably is an unsaturated brine having a composition as is hereinafter described for the brine used for diluting the conditioned pulp to the desired degree for froth flotation. The use of such an unsaturated brine during the conditioning is more important when conditioning in pulps having a relatively lower solids content. The use of such an unsaturated brine during the conditioning produces better flotation efficiencies during the subsequent flotation. For proper conditioning the material is preferably in the form of a relatively thick pulp, usually from about 50% to about 75% solids content. The slime controllant is used in manner and amount which is conventional in cationic sylvite flotation processes. Various slime control agents are known; starch being preferred. Other slime control agents are guar and the polyglycol ethers disclosed in U.S. Patent No. 2,724,499. Other slime control agents are sold by the Dow Chemical Company and General Mills, Incorporated.

The conditioning with the slime controllant is generally for a period of time within the range of from about 0.1 to about 10 minutes with about 1 minute being suitable.

After conditioning the langbeinite-containing material with a slime controllant, the langbeinite-containing material is conditioned with an anionic flotation reagent. Other reagents which are usually used with the anionic flotation reagent are extenders and frothers. These other reagent materials contribute to the efficiency of the flotation reagent and their use is conventional in cationic flotation of sylvite and they may be used in such conventional manner and in conventional amount in the process of the present invention. In general the total weight of the flotation reagent used is within the range of from about 0.1 to about 10 lbs. per ton of solids to be conditioned and more preferably within the range of from about 0.2 to about 5 lbs. of flotation reagent per ton of solids conditioned.

The invention generically embraces the anionic or negative ion reagents known to the flotation art. Such reagents include, inter alia, fatty acids or fatty acid soaps, particularly mixed fatty acids or soaps thereof, fatty acids or soaps of acids derived from natural sources, sources such as tall oil soaps and floating soap; fatty acids or soaps of acids derived from animal and vegetable fats; esters of inorganic acids with high molecular weight alcohols, and the like. The higher molecular weight fatty acids containing from about 8 to about 20 carbon atoms in the molecule ($C_8$ to $C_{20}$) are preferred, specifically, oleic, linoleic, linolenic, steric, and palmitic acids. Included within the term soaps of such negative ion or anionic type reagents are the alkali metal and alkaline earth metal soaps such as sodium, potassium, aluminum, calcium and magnesium soaps. Conventionally, such anionic collectors are used in solution or as an emulsion or dispersion in a carrier or extender medium such as a hydrocarbon oil, normally kerosene or fuel oil.

The amount of negative ion or anionic collector which is employed to produce a langbeinite flotation concentrate may vary over a fairly wide range. From about 0.1 to about 10 lbs. of the collector per ton of solids may be used, but between about 0.4 lb. and about 2 lbs. of anionic collector per ton of solids in the flotation pulp has been found to be particularly advantageous.

It is also conventional to incorporate in the flotation mixture a suitable frothing agent, such as an aliphatic alcohol of intermediate molecular weight (around $C_4$–$C_{10}$), a preferred example being methyl isobutyl carbinol. Other suitable frothing agents are described in the art.

The amount of frothing agents, extender, and other agents such as pine oil, kerosene, fuel oil, etc. which are optionally present during flotation may also vary over fairly wide limits, and generally are employed in amounts of between about 0.05 and about 1 lb. per ton of solids in the flotation pulp. The conditioning with the flotation reagent is generally for a period of time within the range of from about 0.1 minute to about 10 minutes with about 2 minutes being suitable.

After conditioning, the slurry is diluted with brine to the desired degree for froth flotation, preferably to a solids concentration between about 20% and about 35% solids, and separately subjected to a froth flotation operation. In the froth flotation, usually in a froth flotation cell, the langbeinite mineral is floated, is removed from the upper portion of the flotation cell and is separately recovered as a froth product. The separately withdrawn underflow of the flotation operation is predominantly the gangue material and may be discarded or may be recovered as a product of the process or may be treated in any desired manner.

While the prior art processes for flotation of water soluble materials usually emphasize the use of a flotation brine that is saturated with respect to the soluble components of the feed, it has now been discovered, and the present invention is in part based on this discovery, that more efficient froth flotation and higher recoveries of langbeinite are achieved when the brine during the flotation operation, and preferably the brine used during conditioning as is hereinbefore set forth, are constituted as hereinafter set forth.

The criticality of the concentration of the brine with respect to certain ions, and the effect of the concentration of these ions on the recovery by flotation of concentrates containing about 85% langbeinite is illustrated in the drawing, of which:

FIG. 1 is a graph showing the inter-action of potassium ion and sulfate ion concentration, and the effect these variables demonstrate on the recovery of a concentrate containing about 85% langbeinite;

FIG. 2 is a graph showing the inter-action of magnesium ion concentration and sulfate ion concentration and the effect these variables demonstrate on the recovery of a concentrate containing about 85% langbeinite; and, FIG. 3 is a graph showing the inter-action of magnesium ion and potassium ion concentration, and the effect these variables demonstrate on the recovery of a concentrate containing about 85% langbeinite.

The brine used is prepared by dissolving langbeinite, sylvite and halite components of the ore and contains potassium ions, sodium ions, magnesium ions, chloride ions and sulfate ions. It has been determined that the magnesium content of the brine is very important when operating at relatively high recoveries. In accordance with the present invention the flotation brine used, and preferably the brine used in the conditioning, contains from about 0.5% to about 1.8% by weight magnesium ion and preferably contains from about 0.75% to about 1.25% by weight magnesium ion. The brine also contains about 1.8% to about 5.0% by weight potassium ion, calculated as KCl, and preferably from about 3.0% to about 4.6% by weight potassium ion, calculated as KCl. The sulfate, $SO_4$ content of the brine is controlled within the range of from about 0.5% to about 5% by weight, and preferably within the range of from about 1.0% to about 3.0% by weight. The sodium content of the flotation brine does not appear to substantially affect the flotation efficiency and the brine may be unsaturated with respect to NaCl but is preferably saturated with respect to NaCl. Sodium chloride exists in small particle size and is very rapidly soluble; accordingly, when the langbeinite-containing material to be beneficiated in the process of the present invention contains sodium chloride, which is the general case, the brine rapidly becomes saturated with respect to NaCl. The preferred and more preferred ranges of the amounts of the constituents in the brine are tabulated below in Table 1.

TABLE 1

| Constituent | Range, Percent by Weight | Preferred Range, Percent by Weight |
| --- | --- | --- |
| $Mg^{++}$ | 0.5–1.8 | 0.75–1.25 |
| $K^+$ (calculated as KCl) | 1.8–5.0 | 3.0–4.6 |
| $SO_4^{--}$ | 0.5–5.0 | 1.0–3.0 |
| NaCl | Saturated | Saturated |

It will be understood that the chloride ion concentration is not controlled, and that ordinarily this ion will be present in about that amount which will provide stoichiometric balance between the controlled anions and cations. The brine will ordinarily be saturated with sodium chloride. It is especially preferred that the concentrations of the controlled ions be maintained within the 95% recovery curve (shaded area) of FIG. 1, FIG. 2, or FIG. 3. The shaded area of FIG. 1 includes those values of potassium and sulfate ion concentration which will permit the recovery of 95% or more of the feed langbeinite as a flotation concentrate assaying about 85% by weight of langbeinite, when the magnesium ion concentration is held at about 1.0%. Similarly, the curve inside this shaded area defines the 96% and higher langbeinite recovery values. The shaded area of FIG. 2 includes those values of magnesium and sulfate ion concentration which will permit recovery of 95% or more of the feed langbeinite as a flotation concentrate assaying about 85% langbeinite when the potassium ion concentration is held between 3.0% and 4.5% by weight. The shaded area of FIG. 3 includes those values of magnesium and potassium ion concentration which will permit recovery of 95% of the feed langbeinite as a flotation concentrate assaying about 85% langbeinite when the sulfate ion concentration is held between 1.0% and 3.0%.

The graphs of FIGURES 1, 2, and 3 illustrate the interdependence of the three controlled ion concentrations on langbeinite recovery, and define graphically the infinite number of possible brine conditions which will permit the extraordinary high langbeinite recoveries obtainable through the method of this invention. It will, however, be understood that the invention can be practiced by operating within either the broader range or preferred range for each variable set forth in Table 1. It will be understood, however, that due to the interdependence of the three variables it is possible to select values within the broader range defined for each variable at which recoveries substantially lower than 95% may be obtained. Those skilled in the art can, by reference to the graphs, readily choose those concentrations of potassium, magnesium, and sulfate ion concentration which will permit recovery of 95% or more of the feed langbeinite. It will be understood that in the graphs, as throughout this specification and the appended claims, potassium ion concentrations are reported calculated as potassium chloride. It will further be understood that the use of different flotation reagents within the afore-defined class, or the use of differing amounts of flotation reagent, can effect langbenite recoveries. The 96% recoveries illustrated in the drawing are considered to be about optimum. The use of certain reagents, especially at the lower concentrations, may produce lower yields of concentrate. Nevertheless, optimum yields for each reagent or reagent concentration will ordinarily be obtained using a flotation brine constituted as afore-defined.

At concentrations of sulfate above 4% relatively insoluable glaserite begins to form and deposit on the lines and flotation apparatus and is definitely not preferred. Below the ranges set forth in Table 1, langbeinite, is relatively more soluble and langbeinite in the solids will, therefore, pass into solution and lower the recovery of langbeinite. At concentrations above the ranges set forth in the table, the recovery of langbeinite drops off sharply and is, accordingly, not preferred.

After the conditioned material has been diluted with the brine, to the desired degree for froth flotation, it is subjected to a froth flotation operation. In the flotation cell, in the presence of mechanical agitation and/or aeration, a froth is formed which carries the langbeinite to the surface where the froth and its suspended solids are removed as overflow from the flotation cell. The removal of the floated solids as overflow from the cell is usually promoted by the use of paddles or rakes which skim over the surface of the brine in the cell. The froth is removed from the cell relatively soon after its formation. In a continuous operation the froth is continuously removed as it is formed.

The flotation operation is usually carried out in a plurality of such flotation cells associated together in series. Thus, in the first flotation cell, a large portion of the langbeinite may be floated out while still leaving in the pulp a substantial amount of langbeinite which is substantially removed by a repetition of the flotation process in the succeeding cells to the end that the pulp passing from the final cell contains substantially none of the liberated langbeinite particles. Flotation machines having a plurality of flotation cells connected in series are commercially available and suitable machines are those referred to in the art as Fagergren flotation machines and Denver flotation machines.

The floated material is separately removed from the flotation cell as is the underflow. The floated material may be subjected to further beneficiation when desired or dried and recovered as a final product of the process.

In order to give a fuller understanding of the invention, but with no intention to be limited thereto, the following specific example is given:

*Example*

A −8 +100 mesh fraction of a comminuted langbeinite ore mined in the Carlsbad district of New Mexico, analyzing 41% langbeinite, was subjected to a series of froth flotation tests. The gangue was predominantly halite and sylvite. The ore fraction was deslimed, slurried, in a brine to 70% solids content and conditioned for one minute with potato starch added as a 2% brine solution. The potato starch was used in amount of one pound per ton of solids being conditions. A tall oil blend was then added to the conditioner and conditioning continued for two more minutes. The tall oil blend used was a commercial tall oil, specifically Acintol 2122, a refined tall oil heads containing 0.5% rosin acids, 35% unsaponifiables and 64.4% fatty acids and FA1, a refined tall oil material containing 4.0% rosin acids, 4.0% unsaponifiables and 92% fatty acids. The composition of the fatty acids in the FA1 was 44.0% linoleic, 50% oleic and 6% saturated. The tall oil blend was used in amount of one pound per ton of solids in the conditioner. The conditioned material was diluted with brine to 28% solids and subjected to conventional froth flotation to achieve a concentrate assaying about 85% langbeinite.

The langbeinite froth was separately removed from the flotation cell and the recovery measured.

A series of tests was conducted using various compositions of brines for the conditioning and diluting to 28% solids for flotation. The brine used in all these tests was saturated with respect to NaCl. The results of the tests are as follows:

| Test No. | Brine Composition, Wt. Percent | | | Recovery |
| --- | --- | --- | --- | --- |
| | KCl | Mg | SO₄ | |
| 1 | 3.4 | 1.0 | 2.9 | 96.1 |
| 2 | 4.2 | 1.0 | 1.1 | 95.9 |
| 3 | 4.6 | 1.0 | 2.0 | 95.8 |
| 4 | 4.1 | 1.9 | 2.0 | 93.2 |
| 5 | 2.2 | 1.0 | 3.1 | 93.0 |
| 6 | 2.1 | 1.0 | 1.1 | 91.7 |
| 7 | 5.0 | 0.3 | 2.0 | 91.4 |
| 8 | 3.7 | 0.3 | 1.1 | 91.2 |
| 9 | 1.2 | 1.0 | 4.1 | 91.2 |
| 10 | 1.3 | 1.0 | 2.0 | 90.2 |
| 11 | 1.1 | 0.3 | 1.1 | 90.2 |
| 12 | 2.1 | 0.3 | 4.0 | 89.9 |
| 13 | 4.1 | 2.6 | 1.3 | 89.8 |
| 14 | 3.7 | 0.3 | 3.7 | 89.0 |
| 15 | 7.4 | 1.0 | 2.0 | 88.0 |
| 16 | 1.4 | 0.3 | 3.1 | 86.0 |
| 17 | 3.9 | 1.8 | 4.0 | 85.9 |
| 18 | 7.0 | 1.0 | 3.9 | 84.8 |
| 19 | 5.0 | 0.3 | 4.0 | 81.2 |
| 20 | 3.9 | 2.6 | 3.0 | 79.7 |
| 21 | 6.7 | 4.4 | 1.4 | 60.5 |
| 22 | 6.3 | 4.4 | 3.4 | 55.9 |
| 23 | 6.3 | 0.4 | 3.1 | 89.5 |
| 24 | 6.7 | 4.2 | 2.3 | 56.9 |
| 25 | 6.3 | 4.3 | 2.0 | 57.2 |
| 26 | 1.4 | 4.4 | 2.2 | 58.2 |
| 27 | 2.1 | 1.1 | 5.0 | 93.8 |
| 28 | 7.0 | 1.1 | 4.9 | 88.5 |
| 29 | 3.5 | 1.1 | 2.8 | 96.1 |

The results of these tests clearly illustrate the importance of brine composition as set forth in Table 1 and the attendant discussion.

The description of the invention utilized specific reference to certain process details, however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

The embodiments of the invention in which an exclusive property or privilege is claimed are defined as follows:

1. A process for the benefication of a material containing discrete particles of minerals of the group consisting of langbeinite, leonite and schoenite, and discrete particles of gangue which comprises subjecting said mineral-containing material to froth flotation in the presence of an anionic flotation reagent in a brine containing potassium, sodium, magnesium, chloride and sulfate ions, said brine containing magnesium ions in the amount of about 0.5 to about 1.8% by weight, sulfate ions in the amount of 0.5 to about 5.0% by weight, and potassium ions (calculated as KCl) in the amount of about 1.8 to about 5.0% by weight, said brine being substantially saturated with respect to sodium chloride.

2. The process in accordance with claim 1 in which the magnesium ion concentration is in the range of 0.75 to 1.25% by weight.

3. The process in accordance with claim 1 in which the potassium ion concentration (calculated as KCl) is in the range of 3.0 to 4.6% by weight.

4. The process in accordance with claim 1 in which the sulfate ion concentration is within the range of about 1.0 to about 3.0% by weight.

5. The method in accordance with claim 1 in which said mineral is langbeinite.

6. The method in accordance with claim 1 in which said mineral is langbeinite, said magnesium ion content is about 1.0% by weight, and the sulfate ion and potassium ion concentrations fall within either shaded area of FIG. 1.

7. The method in accordance with claim 1 in which said mineral is langbeinite, said potassium ion concentration (calculated as KCl) is within the range of 3.0 to 4.5% by weight, and the magnesium ion and sulfate ion concentrations fall within either shaded area of FIG. 2.

8. The method in accordance with claim 1 in which said mineral is langbeinite, saaid sulfate ion concentration is in the range of 1.0 to 3.0% by weight, and the magnesium ion and potassium ion concentrations fall within either shaded area of FIG. 3.

9. The process in accordance with claim 1 in which said material is a comminuted langbeinite ore of particle size of about −8 mesh having less than 10% by weight −100 mesh particles.

10. The method in accordance with claim 1 in which said material is a langbeinite ore having a particle size of about −8 mesh +100 mesh and having less than 50% by weight −65 mesh particles.

11. The method in accordance with claim 1 in which said material comprises a −8 +100 mesh tailing from a sylvite flotation process.

12. The method in accordance with claim 10 in which said material is conditioned with a slime-controllant and subsequently conditioned with an anionic flotation reagent.

13. The method in accordance with claim 12 in which said anionic flotation reagent comprises a fatty acid containing from 8 to about 12 carbon atoms per molecule.

14. The method in accordance with claim 12 in which said slime-controllant is starch.

15. The method in accordance with claim 12 in which said anionic flotation reagent comprises tall oil.

16. The method in accordance with claim 12 in which said mineral is langbeinite, said magnesium ion content is about 1.0% by weight, and the sulfate ion and potassium ion concentrations fall within either shaded area of FIG. 1.

17. The method in accordance with claim 12 in which said mineral is langbeinite, said potassium ion concentration (calculated as KCl) is within the range of 3.0 to 4.5% by weight, and the magnesium ion and sulfate ion concentrations fall within either shaded area of FIG. 2.

18. The method in accordance with claim 12 in which said mineral is langbeinite, said sulfate ion concentration is in the range of 1.0 to 3.0% by weight, and the magnesium ion and potassium ion concentrations fall within either shaded area of FIG. 3.

References Cited by the Examiner

UNITED STATES PATENTS

| | | | |
|---|---|---|---|
| 2,297,664 | 9/1942 | Tartaron | 209—167 |
| 2,724,499 | 11/1955 | Smith | 209—166 |
| 2,733,809 | 2/1956 | Wrege | 209—166 |

FOREIGN PATENTS

| | | |
|---|---|---|
| 959,541 | 3/1957 | Germany. |
| 574,442 | 3/1958 | Italy. |

OTHER REFERENCES

U.S. Bureau of Mines, RI 3300, February 1936, 4 pp.

HARRY B. THORNTON, *Primary Examiner.*
R. HALPER, *Assistant Examiner.*